US012255780B2

(12) United States Patent
Muñoz De La Torre Alonso

(10) Patent No.: US 12,255,780 B2
(45) Date of Patent: Mar. 18, 2025

(54) USER PLANE BASED EXPOSURE

(71) Applicant: Telefonaktiebolaget LM Ericsson (publ), Stockholm (SE)

(72) Inventor: Miguel Angel Muñoz De La Torre Alonso, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 60 days.

(21) Appl. No.: 17/908,278

(22) PCT Filed: May 25, 2020

(86) PCT No.: PCT/EP2020/064397
§ 371 (c)(1),
(2) Date: Aug. 31, 2022

(87) PCT Pub. No.: WO2021/209160
PCT Pub. Date: Oct. 21, 2021

(65) Prior Publication Data
US 2023/0155891 A1 May 18, 2023

(30) Foreign Application Priority Data
Apr. 16, 2020 (EP) .................................... 20382307

(51) Int. Cl.
*H04L 41/0893* (2022.01)
*H04L 61/4511* (2022.01)
*H04L 67/61* (2022.01)
(52) U.S. Cl.
CPC ...... *H04L 41/0893* (2013.01); *H04L 61/4511* (2022.05); *H04L 67/61* (2022.05)
(58) Field of Classification Search
None
See application file for complete search history.

(56) References Cited

U.S. PATENT DOCUMENTS

| 11,064,457 | B2 | 7/2021 | Bolle et al. |
| 2018/0192390 | A1* | 7/2018 | Li ........................ H04W 72/53 |
| 2020/0127968 | A1 | 4/2020 | Tang et al. |

FOREIGN PATENT DOCUMENTS

| CN | 109429370 A | 3/2019 |
| CN | 110622589 A | 12/2019 |

(Continued)

OTHER PUBLICATIONS

3rd Generation Partnership Project, "3rd Generation Partnership Project; Technical Specification Group Services and System Aspects; System architecture for the 5G System (5GS); Stage 2 (Release 16)", Technical Specification, 3GPP TS 23.501 V16.3.0, Dec. 1, 2019, pp. 1-417, 3GPP.

(Continued)

*Primary Examiner* — Ario Etienne
*Assistant Examiner* — Mohammad Yousuf A. Mian
(74) *Attorney, Agent, or Firm* — COATS & BENNETT, PLLC

(57) ABSTRACT

The invention relates to a method for operating a user equipment (100) requesting a data packet flow from an application entity transmitted through a cellular network to the user equipment, comprising: —transmitting (S20) a first request to a translating entity (700) configured to translate a name of the application entity providing the data packet flow to an address of the application entity through which the application entity can be reached, the first request requesting an identification of a user plane entity (200) configured to handle the data packet flow in the cellular network, —receiving (S24) a response to the first request, the response comprising a user plane identifier identifying the user plane entity (200), —transmitting (S26) a policy request to the identified user plane entity (200), the policy request comprising a flow identifier allowing an identification of the data packet flow in the cellular network, and policy information (Continued)

indicating a policy to be applied to the data packet flow in the cellular network for a transmission of the data packet flow through the cellular network.

12 Claims, 14 Drawing Sheets

(56) References Cited

FOREIGN PATENT DOCUMENTS

EP        3500055 A1    6/2019
WO    WO-2018120195 A1 *  7/2018

OTHER PUBLICATIONS

Huawei et al., "Application-influenced SSC and UP management", 3GPP TSG SA WG2 Meeting #119, Dubrovnik, Croatia, Feb. 13, 2017, pp. 1-6, S2-171466, 3GPP.

* cited by examiner

USER PLANE BASED EXPOSURE

TECHNICAL FIELD

The present application relates to a method for operating a user equipment requesting a data packet flow from an application entity transmitted through a cellular network to the user equipment. Furthermore the corresponding user equipment is provided. Additionally a method for operating a user plane entity is provided configured to handle the data packet flow and the corresponding user plane entity itself. In addition a method for operating a policy control entity is provided and the corresponding policy control entity. Furthermore, a method for operating a translating entity is provided configured to translate a name of an application function providing the data packet flow through the cellular network to the user equipment. Additionally the corresponding translating entity is provided, a system comprising at least two of the entities mentioned above. Furthermore a computer program comprising program code and a carrier comprising the computer program is provided.

BACKGROUND

FIG. 1 shows a 5G New Radio, NR, architecture with service based interfaces. Service Based Interfaces are represented in the format Nxyz, such as Nsmf, and point to point interfaces in the format Nx, such as N4.

The 5G core network part comprises a Network Slice Selection Function, NSSF, 10, a Network Exposure Function, NEF, 15, a Network Repository Function, NRF, 20, a Policy Control Function, PCF, 25, a Unified Data Management, UDM, 30, an Application Function, AF, 35, an Authentication Server Function, AUSF, 40, an Access and Mobility Management Function, AMF, 45, and a Session Management Function, SMF, 50. Having service based interfaces in the 5G Core Control Plane, CP, implies that the Network Functions, NFs, in the 5G Core CP provide services that are consumed by other NFs in the 5G Core CP.

A User Equipment, UE, 60, is connected to the Radio Access Network, RAN, 65, wherein a User Plane Function, UPF, 70 is provided to connect the UE 60 to a Data Network, DN, 75.

The roles of these entities and the interfaces between them are defined, for instance, in the 3GPP TS 23.501 and the procedures are described, for instance, in 3GPP TS 23.502.

Relevant 5G System Architecture network aspects and functions for this invention are the following:

The Network Exposure Function (NEF) supports different functionality and specifically in the context of this application, NEF acts as the entry point into operator's network, so an external AF (Content Provider) interacts with the 3GPP Core Network through NEF.

The Policy Control Function (PCF) 25 supports a unified policy framework to govern the network behaviour. Specifically, for this application, the PCF provides PCC (Policy and Charging Control) rules to the PCEF (Policy and Charging Enforcement Function), i.e. the SMF 50/UPF 70 that enforces policy and charging decisions according to provisioned PCC rules.

The Session Management function (SMF) 50 supports different functionality, e.g. Session Establishment, modify and release, and policy related functionalities like termination of interfaces towards Policy control functions, Charging data collection, support of charging interfaces and control and coordination of charging data collection at UPF. Specifically, for this application, SMF receives PCC rules from PCF and configures UPF accordingly through N4 reference point (PFCP protocol) as follows:

SMF 50 controls the packet processing in the UPF 70 by establishing, modifying or deleting PFCP (packet Forwarding Control Protocol) Sessions and by provisioning (i.e. adding, modifying or deleting) PDRs (Packet Detection Rules), FARs (Forwarding Action Rules), QERs (QoS Enforcement Rules) and/or URRs (Usage Reporting Rules) per PFCP session, whereby a PFCP session may correspond to an individual PDU (Protocol Data Unit) session or a standalone PFCP session not tied to any PDU session.

Each PDR contains a PDI (Packet Detection Information) specifying the traffic filters or signatures against which incoming packets are matched. Each PDR is associated to the following rules providing the set of instructions to apply to packets matching the PDI:
  one FAR (forwarding Action rule), which contains instructions related to the processing of the packets, specifically forward, duplicate, drop or buffer the packet with or without notifying the CP (Control Plane) function about the arrival of a DL (Downlink) packet.
  zero, one or more QERs, which contains instructions related to the QoS enforcement of the traffic;
  zero, one or more URRs, which contains instructions related to traffic measurement and reporting.

The User Plane function (UPF) 70 supports handling of user plane traffic based on the rules received from SMF 50 specifically, for this application, packet inspection (through PDRs) and different enforcement actions, e.g. traffic steering, QoS, Charging/Reporting (through FARs (Forwarding Action Rule), QERs, URRs).

3GPP has defined a framework for Exposure. There is both an internal exposure and external exposure:
  Internal exposure: between network operator's NFs, e.g. between PCF and SMF (PCF as consumer of the Nsmf_EventExposure service).
  External exposure: between network operator's NFs (e.g. AMF, SMF, PCF) and external NFs (e.g. AF 35). This is done through NEF (which pertains to the network operator).

External exposure allows collaborative solutions, which are based on exchanging information between network operator (e.g. Vodafone UK) and content provider (e.g. Google), e.g. by Google sending to Vodafone UK the rules to detect YouTube traffic or by Vodafone UK sending Google the subscriber's remaining monthly quota, so Google's YT servers can adapt video codec resolution.

The existing 3GPP Exposure framework is Control Plane based, where the network operator offers a Nnef Northbound interface which provides an out-of-band channel for content providers (OTT (Over the Top) through AF) to expose information with 3GPP-based network operators (where NEF is the entry point). The content provider application traffic goes through a separate channel on the user plane. This is shown in FIG. 2 where the control plane information is exchanged between the NEF 15 and the application function 35. Furthermore, the above discussed exposure occurs in the control plane 80. The user plane 85 exchange the data packet flow with the application server 90.

QUIC is a UDP (User Datagram Protocol) based stream-multiplexed and secure transport protocol with integrity protected header and encrypted payload. Unlike the traditional transport protocol stack with TCP (Transmission Control Protocol), which resides in the operating system kernel, QUIC can easily be implemented in user space, i.e. in the application layer. As a consequence, this improves flexibility in terms of transport protocol evolution with implementation of new features, congestion control, deployability and adoption.

QUIC is currently undergoing standardization in the IETF. QUIC standardization efforts started some 7 years ago, and as of now composes nearly 10% of the Internet traffic pushed by large Internet domains such as Google.

QUIC is likely to become the main transport protocol in the Internet's user plane. It is expected that most applications running today over HTTP/HTTPS will migrate to QUIC, driven by latency improvements and stronger security. Notably, compared to HTTPS, encryption in QUIC covers both the transport protocol headers as well as the payload, as opposed to TLS over TCP, e.g. HTTPS, which protects only the payload.

3GPP supports an Exposure framework, specifically a Nnef Northbound interface which provides an out-of-band channel for content providers to exchange information with 3GPP-based network operators. As shown in FIG. 2, this out-of-band channel goes through the control plane and it is very difficult to correlate with the user plane channel (which carries content provider's application traffic), specifically with the recent increase in the adoption of traffic encryption by content providers (such as HTTP/3 or QUIC). Additionally, the NEF is a complex entity recently defined by 3GPP and consequently it is foreseen not to be supported by many network operators.

Accordingly, a need exists to overcome the above-mentioned problems and to facilitate an exposure, in which a content provider such as an application function which operates the application function informs the cellular network about the policy to be applied to the data packet flow in the cellular network.

SUMMARY

This need is met by the features of the independent claims. Further aspects are described in the dependent claims.

According to a first aspect a method for operating a user equipment is provided requesting a data packet flow from an application entity transmitted through a cellular network to the user equipment. According to one step a first request is transmitted to a translating entity configured to translate a name of the application entity providing the data packet flow to an address of the application entity through which the application entity can be reached, wherein the first request requests an identification of the user plane entity configured to handle the data packet flow in the cellular network. Furthermore, a response is received to the first request wherein the response comprises a user plane identifier identifying the user plane entity. Furthermore, a policy request is transmitted to the identified user plane entity, wherein the policy request comprises of flow identifier allowing an identification of the data packet flow in a cellular network. The policy request furthermore comprises policy information indicating a policy to be applied to the data packet flow in the cellular network for a transmission of the data packet flow through the cellular network.

With this method the user equipment, UE, can directly communicate with the user plane entity and can inform the user plane entity of the policy to be applied to the data packet flow. As there might be an agreement between the user entity and the application entity (also called function hereinafter) or application entity how to handle the data packet flows, this information can be directly transmitted and exchanged between the user equipment and the user plane entity, so that there is no need to use the control plane.

Furthermore, the corresponding user equipment is provided comprising at least one processing unit and a memory, wherein the memory contains instructions executable by the at least one processing unit. The user equipment is operative to work as discussed above or as discussed in further detail below.

As an alternative, a user equipment is provided comprising a first module configured to transmit the first request to the translating entity which translates the name of the application entity providing the data packet flow to an address of the application entities through which the application entity can be reached. This first module furthermore requests an identification of the user plane entity which handles the data packet flow in the cellular network with the first request. The user equipment comprises a second module configured to receive the response to this first request wherein the response comprises the user plane identifier which identifies the user plane entity handling the data packet flow in the cellular network. A third module is configured to transmit a policy request to the identified user plane entity wherein this policy request is configured such that it comprises a flow identifier allowing an identification of the data packet flow in the network and comprises policy information indicating the policy to be applied to the data packet flow in the network.

Furthermore, a method is provided for operating a user plane entity which is configured to handle the data packet flow transmitted from the application entity through the cellular network to the user equipment. The user plane entity receives a first policy request wherein this first policy request comprises the flow identifier allowing the identification of the data packet flow in the network and comprises the policy information indicating the policy to be applied to the data packet flow in the cellular network for the transmission of the data packet flow through the cellular network. This first policy request corresponds to the policy request mentioned above transmitted by the user equipment. Furthermore, a second policy request is transmitted to a policy control unit of the cellular network wherein this second policy request comprises the flow identifier and the policy information as received. Furthermore, a confirmation is received from the policy control unit which confirms that the transmitted policy contained in the policy information is accepted.

Here the user plane entity receives the policy request including the policy. The user plane entity then confirms this policy with the policy control entity.

Furthermore, the corresponding user plane entity is provided comprising at least one processing unit and a memory wherein the memory contains instructions executable by the at least one processing unit. The user plane entity is operative to work as discussed above or as discussed in further detail below.

As an alternative a user plane entity is provided configured to handle a data packet flow therein the user plane entity comprises a first module configured to receive the first policy request which comprises the flow identifier identifying the data packet flow in the cellular network and the policy request comprising policy information indicating the policy to be applied to the data packet flow in the network. The user plane entity then comprises a second module configured to transmit a second policy request to a policy control entity of the cellular network and wherein this second policy request comprises the flow identifier and the policy information. A third module of the user plane entity is configured to receive a confirmation from the policy control entity that the transmitted policy contained in the policy information is accepted.

Furthermore, a method for operating a policy control entity of the cellular network is provided wherein the data packet flow is transmitted from the application entity through the cellular network to the user equipment. The method comprises the step of receiving the policy request from the user plane entity handling the data packet flow in the cellular network wherein the policy request comprises a flow identifier allowing the data packet flow in the cellular network to be identified and the policy request comprising a policy information indicating the policy to be applied to data packet flow in the network for the transmission of the data packet flow through the cellular network. A further step of the method is that the policy control entity determines that the policy as received in the policy request is allowed. Furthermore, an answer is transmitted to the policy request which is transmitted to the user plane entity indicating that the requested policy is allowed.

Furthermore, the corresponding policy control entity is provided configured to control the policy of the data packet flows through the cellular network wherein the policy control entity comprises at least one processing unit and a memory wherein the memory contains instructions executable by the at least one processing unit. The policy control entity is operative to work as discussed above or as discussed in further detail below.

As an alternative a policy control entity is provided configured to control the policy of the data packet flows in the cellular network wherein the policy control entity comprises a first module configured to receive the policy request from the user plane entity including the flow identifier and the policy information including the policy to be applied for the transmission of the data packet flow through the cellular network. A second module is configured to confirm that the policy as received in the policy request is allowed, and a third module of the policy control entity is configured to transmit an answer to the policy request to the user plane entity which indicates that the policy is allowed.

Furthermore, a method for operating a translating entity is provided which is configured to translate a name of an application entity providing a data packet flow through a cellular network to the user equipment to an address of the application entity through which the application entity can be reached. The method comprises a step of receiving a first request from a user equipment which requests the data packet flow from the application entity, wherein this first request requests an identification of the user plane entity which is configured to handle the data packet flow in the cellular network. Furthermore, a user request message is transmitted to a subscriber database of the cellular network requesting identification of the user plane entity which is handling the data packet flow in a cellular network. Additionally a response is received in response to the user request message wherein the response comprises a user plane identifier identifying the user plane entity. Furthermore, the user equipment is informed of the user plane identifier.

Additionally, the corresponding translating entity is provided configured to translate the name of the application entity to an address of the application entity. The translating entity comprises at least one processing unit and a memory wherein the memory contains instructions executable by the at least one processing unit, wherein the translating entity is operative to work as discussed above or as discussed in further detail below.

As an alternative a translating entity is provided configured to translate the name of the application entity providing the data packet flow through the cellular network to the user equipment to an address of the application entity. The translating entity comprises a first module configured to receive the first request from the user equipment requesting an identification of the user plane entity which is handling the data packet flow in the network. A second module of the translating entity is configured to transmit a user request message to a subscriber database which requests an identification of the user plane entity which is handling the data packet flow. A third module is configured to receive a response to the user request message wherein this response comprises a user plane identifier identifying the user plane entity. Finally, a fourth module informs the user equipment of the user plane identifier.

Furthermore, a system is provided comprising at least two of the entities from the group of entities as discussed above. Furthermore, a computer program is provided comprising program code to be executed by at least one processing unit of the user equipment, of the user plane entity, of the policy control entity and of a translating entity. The execution of the program code causes the at least one processing unit of the different entities to carry out a method as discussed above or as discussed in further detail below.

Finally a carrier is provided comprising the computer program wherein the carrier is one of an electronic signal, optical signal, radio signal, and computer readable storage medium.

It is to be understood that the features mentioned above and features yet to be explained below can be used not only in the respective combinations indicated, but also in other combinations or in isolation without departing from the scope of the present application. Features of the above-mentioned aspects and embodiments described below may be combined with each other in other embodiments unless explicitly mentioned otherwise.

BRIEF DESCRIPTION OF DRAWINGS

The foregoing and additional features and effects of the application will become apparent from the following detailed description, when read in conjunction with the accompanying drawings in which like reference numerals refer to like elements.

DETAILED DESCRIPTION

As will be explained below a user plane based exposure mechanism is provided which allows a content provider to exchange information in an efficient way with a network operator. As the content providers application traffic always goes through the user plane, the user plane entity or user plane function, the user plane function could be used as entry point in the operator's network instead of the network exposure function as it is currently the case for a control plane based approach. In the present context exposure means an exposure operating mode in which a content provider operating the application entity informs the cellular network about the policy to be applied to the data packet flow in the cellular network.

In the following the terms entity or function are used interchangeably. Accordingly, the application function can be considered as application entity, the policy control function as policy control entity or the user plane entity as user plane function.

Figure 3:
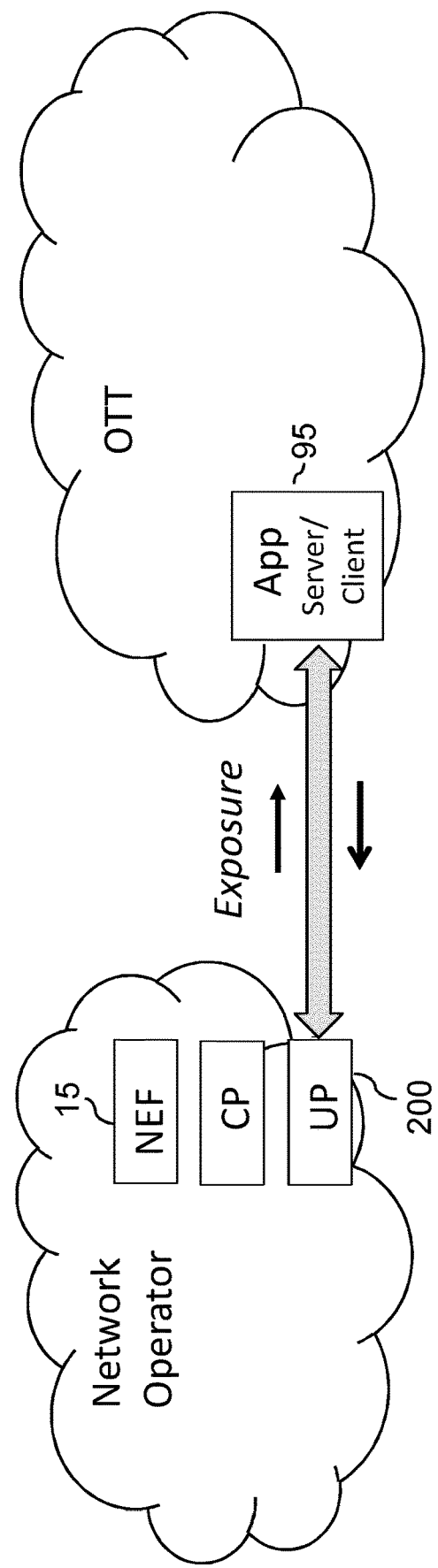
FIG. 3 shows an embodiment of how information is exchanged in the user plane in which an exposure is also carried out in the user plane including features of the invention.

The situation is shown in FIG. 3. In the area of the network operator the network exposure function 15 is provided, wherein the control plane entity user plane is schematically shown in the operator-based area. The user plane could be implemented by the user plane entity 200. The content provider is located in the OTT, over the top, area and an application entity controlled by the content provider provides a data packet flow to a user equipment not shown in FIG. 3.

As shown in FIG. 3 the exposure mechanism, the management of the policies etc. is carried out in the user plane and not in the control plane.

The application covers two main aspects:

the first aspect is the discovery of the user plane entity. Here, a mechanism is proposed for the application entity or the application client provided on the user equipment to discover the user plane entity which handles the data packet session such as the PDU session for the user equipment in the cellular network. To this end, it is proposed to extend the architecture with a service-based operator DNS, Domain Name Server, or translating entity, which offers an Ndns interface and with a service-based user plane entity which office an Nupf interface. The DNS server is also named as translating entity hereinafter as the translating entity is configured to translate the name of the application entity to the address of the application entity.

A second aspect covered by the present application is the exposure itself meaning the mechanism proposed at application level. The exposure information is exchanged between the content provider and the network operator and does not have any impact on the UE itself, mainly the application provided on the UE may carry out the steps mentioned below in which the UE is involved. At the content provider it is the application client or the application layer at the UE and/or the application server on the sending or receiving side to expose the information to the user plane entity or from the user plane entity.

Figure 1:
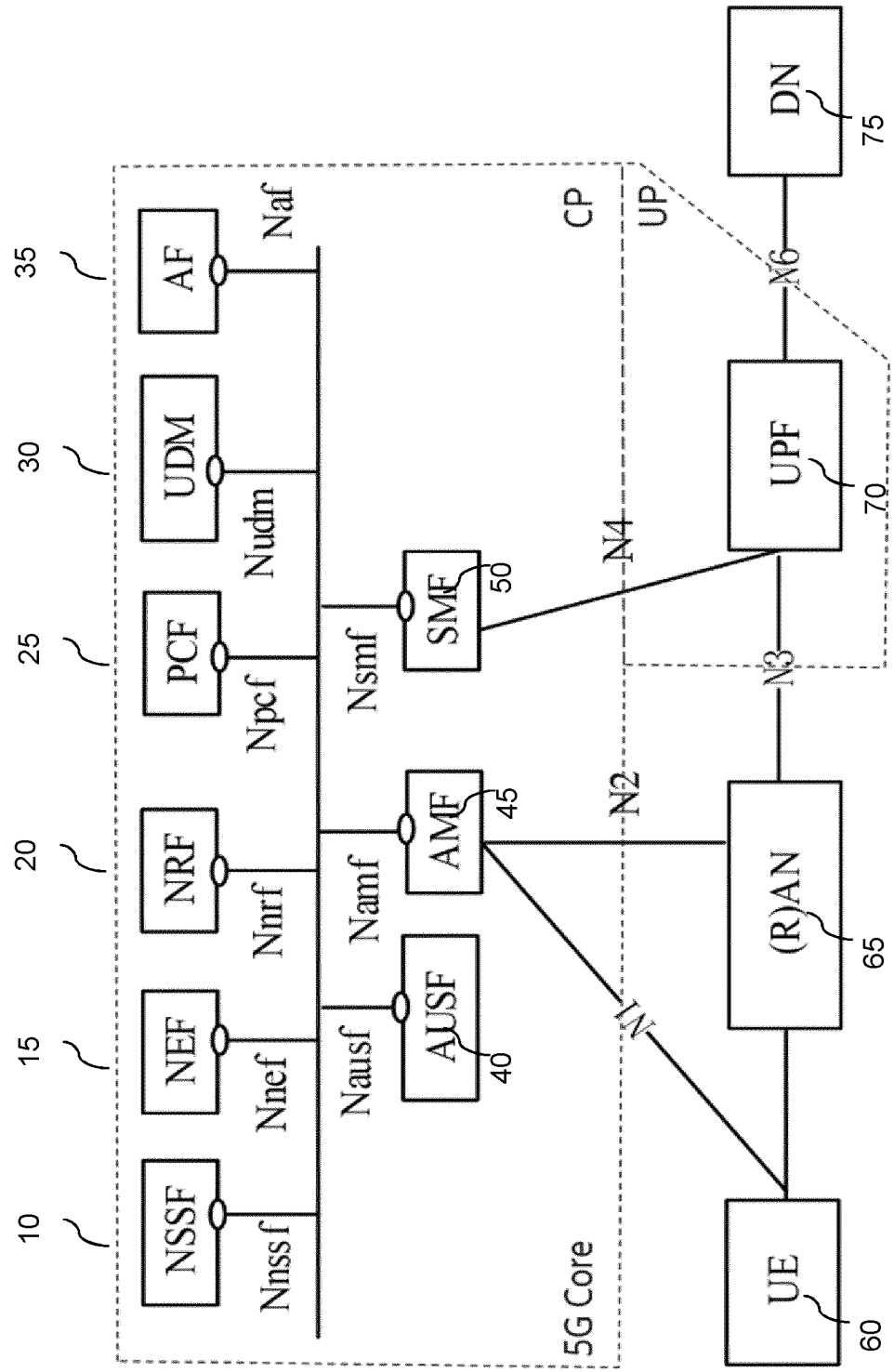
FIG. 1 shows a schematic architectural overview of the network architecture as known in a 5G network.
Figure 2:
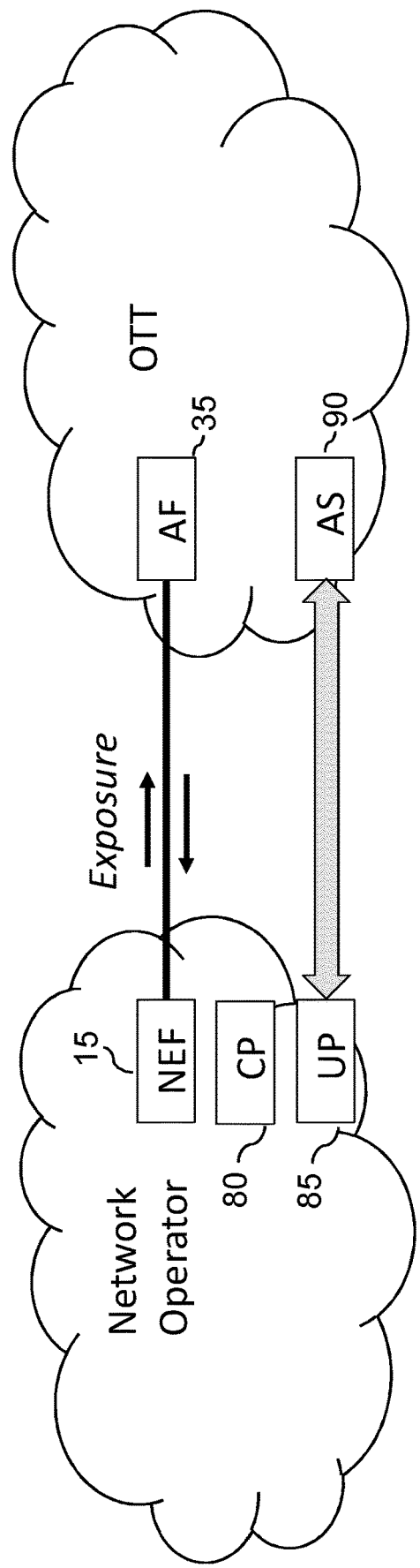
FIG. 2 shows an example exposure in a system as shown in FIG. 1 as known in the art.
Figure 4:
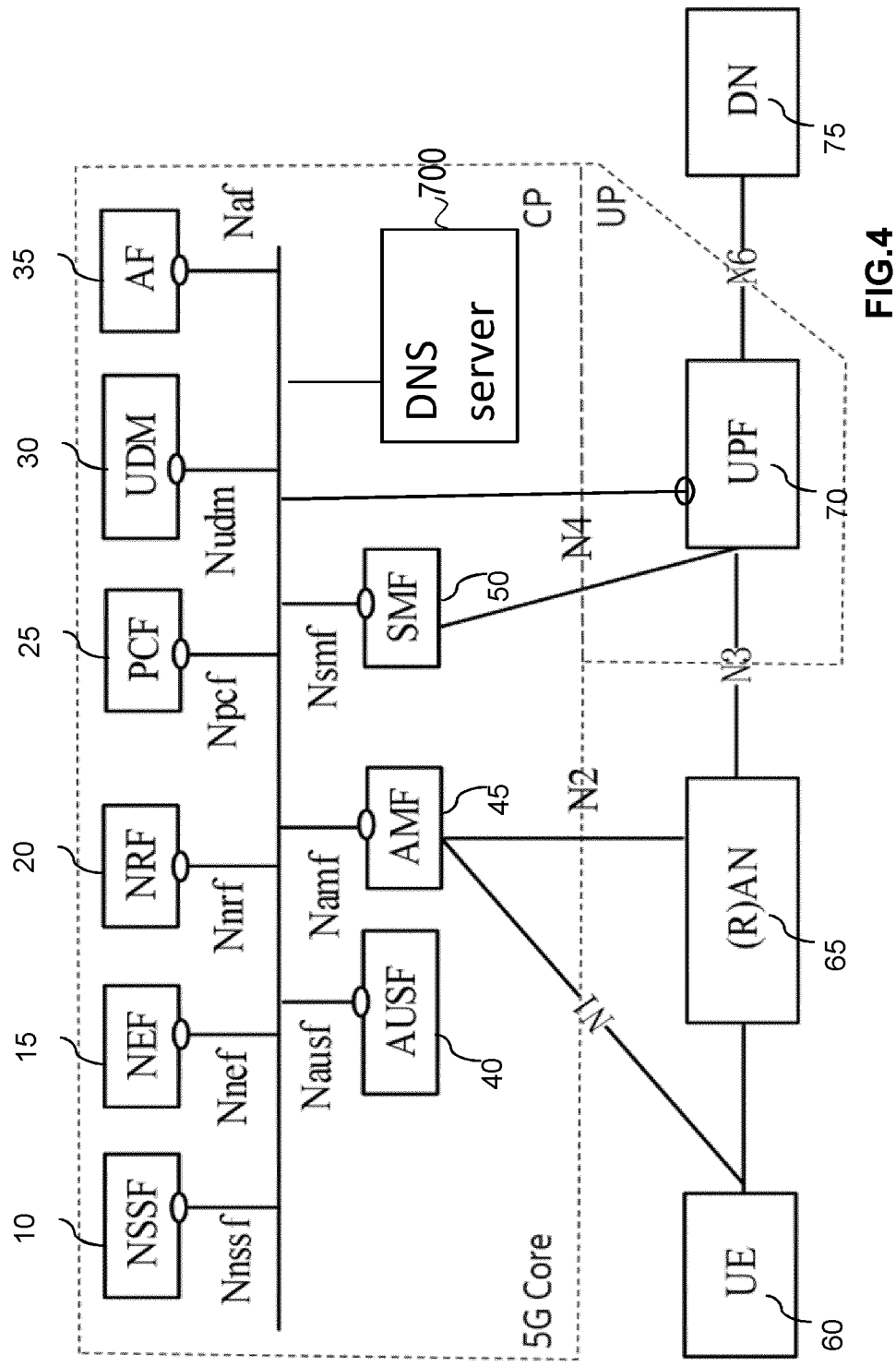
FIG. 4 shows an example schematic architectural overview of a system similar to the system shown in FIG. 1 which is extended with a translating entity and a service based user plane entity including the features of the invention.

FIG. 4 shows the new architecture with the entities involved. As will be explained below the user equipment 100, the user plane entity 200, the PCF 300 and the DNS server or translating entity 700 are amended by the present approach. The other functions are entity as shown in FIG. 4 may correspond to the entities or functions discussed above in connection with FIG. 1 or may also be amended in order to communicate with the entities mentioned above, namely, the UE 100, the user plane entity 200, the policy control entity 300, or the translating entity 700.

Figure 5:
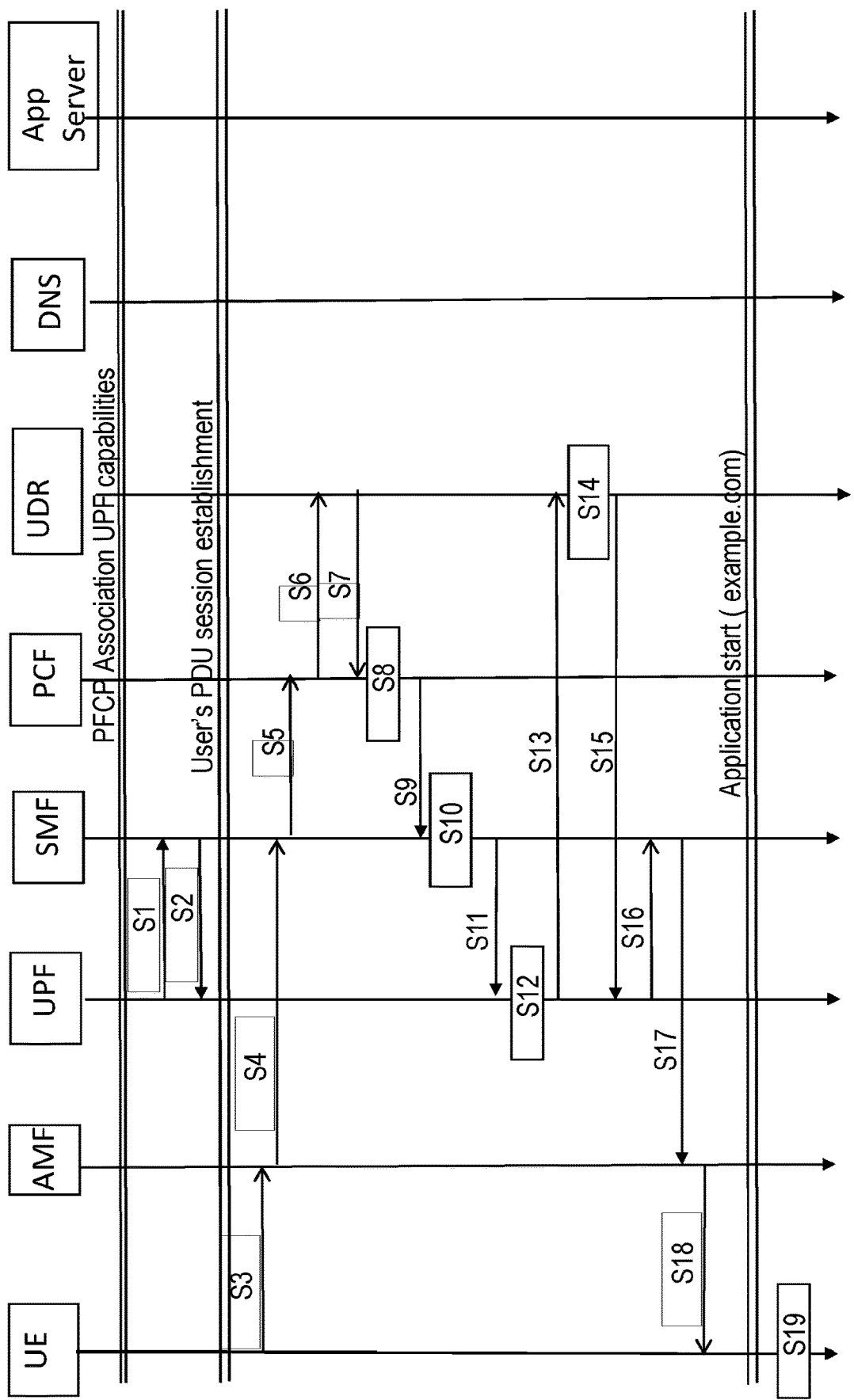
FIG. 5 shows a first part of a message exchange between the entities involved in an architecture as shown in FIGS. 3 and 4.
Figure 6:
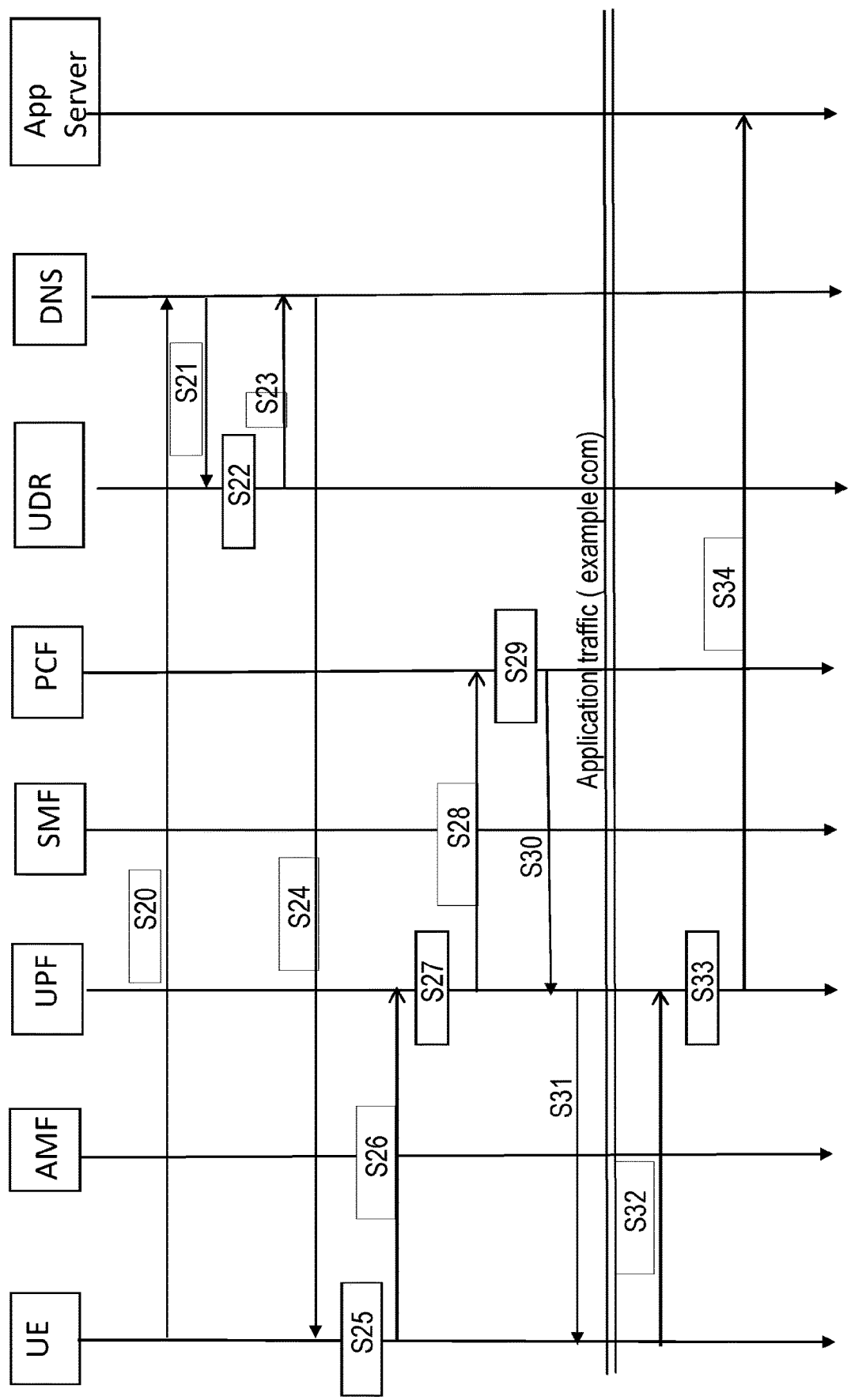
FIG. 6 shows a second part of the message exchange shown in FIG. 5 exchanged between the involved entities in the architecture shown in FIGS. 3 and 4.

In the following a sequence diagram is discussed in more detail as shown in FIGS. 5 and 6 which illustrates an example use case where a content provider such as an application at the UE having the name of example.com requests policies to be enforced by the network operator.

One present assumption is that there is a service level agreement, SLA, between the content provider and the network operator. Accordingly, a user plane exposure mechanism is used for the content provider to exchange information with the network operator, especially for the content provider to request policies regarding the content provider's applications to be enforced by the network operator.

At the network operator the knowledge is pre-provisioned at the UDR database on a per subscriber basis as part of the subscriber policy. Alternatively, the above can be pre-provisioned on a per group of subscribers, on a per slice basis and/or on a per global basis. Furthermore, at the content provider the application client at the UE is pre-provisioned with the network operator's DNS server information such as the IP address or the FQDN, Fully Qualified Domain Name, of the network operator's DNS server.

Reference is now made to FIGS. 5 and 6:

in the example below the steps are explained for a 4G or 5G implementation. It should be understood that the method can be implemented in any other cellular network.

Steps S1 and S2) At PFCP Association procedure between UPF and SMF entities, it is proposed to extend the existing mechanism to report UPF capabilities with a new capability (EXPU, see table below in bold). This would allow SMF to know which UPFs support this capability and thus can influence on UPF selection. (a possible 5G implementation would be PFC Association Request, UPF capabilities: EXPU; PFCP Association Response)

| Feature Octet/Bit | Feature | Interface | Description |
|---|---|---|---|
| 5/1 | BUCP | Sxa, N4 | Downlink Data Buffering in CP function is supported by the UP function. |
| 5/2 | DDND | Sxa, N4 | The buffering parameter 'Downlink Data Notification Delay' is supported by the UP function. |
| 5/3 | DLBD | Sxa, N4 | The buffering parameter 'DL Buffering Duration' is supported by the UP function. |
| 5/4 | TRST | Sxb, Sxc, N4 | Traffic Steering is supported by the UP function. |
| 5/5 | FTUP | Sxa, Sxb, N4 | F-TEID allocation/release in the UP function is supported by the UP function. |
| 5/6 | PFDM | Sxb, Sxc, N4 | The PFD Management procedure is supported by the UP function. |
| 5/7 | HEEU | Sxb, Sxc, N4 | Header Enrichment of Uplink traffic is supported by the UP function. |
| 5/8 | TREU | Sxb, Sxc, N4 | Traffic Redirection Enforcement in the UP function is supported by the UP function. |
| 6/1 | EMPU | Sxa, Sxb, N4 | Sending of End Marker packets supported by the UP function. |
| 6/2 | PDIU | Sxa, Sxb, Sxc, N4 | Support of PDI optimised signalling in UP function (see clause 5.2.1A.2). |
| 6/3 | UDBC | Sxb, Sxc, N4 | Support of UL/DL Buffering Control |
| 6/4 | QUOAC | Sxb, Sxc, N4 | The UP function supports being provisioned with the Quota Action to apply when reaching quotas. |
| 6/5 | TRACE | Sxa, Sxb, Sxc, N4 | The UP function supports Trace (see clause 5.15). |
| 6/6 | FRRT | Sxb, N4 | The UP function supports Framed Routing (see IETF RFC 2865 [37] and IETF RFC 3162 [38]). |
| 6/7 | PFDE | Sxb, N4 | The UP function supports a PFD Contents including a property with multiple values. |
| 6/8 | EPFAR | Sxa, Sxb, Sxc, N4 | The UP function supports the Enhanced PFCP Association Release feature (see clause 5.18). |
| 7/1 | DPDRA | Sxb, Sxc, N4 | The UP function supports Deferred PDR Activation or Deactivation. |
| 7/2 | ADPDP | Sxa, Sxb, Sxc, N4 | The UP function supports the Activation and Deactivation of Pre-defined PDRs (see clause 5.19). |
| 7/3 | UEIP | N4 | The UPF supports allocating UE IP addresses or prefixes (see clause 5.21). |
| 7/4 | SSET | N4 | UPF support of PFCP sessions successively controlled by different SMFs of a same SMF Set (see clause 5.22). |
| 7/5 | MNOP | Sxa, Sxb, Sxc, N4 | UPF supports measurement of number of packets which is instructed with the flag 'Measurement of Number of Packets' in a URR. See also 5.2.2.2.1. |
| 7/6 | MTE | N4 | UPF supports multiple instances of Traffic Endpoint IDs in a PDI. |
| 7/7 | BUNDL | Sxa, Sxb, Sxc, N4 | PFCP messages bunding (see clause 6.5) is supported by the UP function. |
| 7/8 | GCOM | N4 | UPF support of 5G VN Group Communication. (See clause 5.23) |
| 8/1 | MPAS | N4 | UPF support for multiple PFCP associations to the SMFs in an SMF set (see clause 5.22.3). |
| 8/2 | RTTL | N4 | The UP function supports redundant transmission at transport layer. |
| 8/3 | VTIME | Sxb, N4 | UPF support of quota validity time feature. |
| 8/4 | EXPU | Sxb, Sxc, N4 | UP Exposure is supported by the UP function. |

Feature Octet/Bit: The octet and bit number within the Supported-Features IE, e.g. "5.1".
Feature: A short name that can be used to refer to the octet/bit and to the feature.
Interface: A list of applicable interfaces to the feature.
Description: A clear textual description of the feature.

Steps S3 and S4) UE triggers PDU session establishment, by means of sending a N1 PDU Session Establishment Request to AMF. AMF selects an SMF to manage the PDU session, wherein the SMF selection function in the AMF selects an SMF instance based on the available SMF instances obtained from NRF or on the configured SMF information in the AMF and triggers Nsmf PDU Session Create Request. The sequence diagram in FIG. 5 does not include all the signaling messages involved in the PDU Session Establishment procedure. The relevant signaling messages are described in subsequent steps. (N1 PDU Session Establishment Request; Nsmf PDU Session Create Request)

Step S5) SMF triggers towards PCF a Npcf_SMPolicy-Control_Create Request message to retrieve SM policies for the user PDU session. (Npct_SMPolicyControl_Create Request)

Step S6) PCF triggers towards UDR a Nudr_Query Request message to retrieve the policy data for this user's PDU session. (Nudr_Query Request)

Step S7) UDR answers PCF with Nudr_Query Response message including the Subscriber Policy Data, which includes (as Subscriber Policy Data) an indication (e.g. flag) to activate the UP Exposure mechanism. (Nudr_Query Response, {Subscriber Policy Data including UP Exposure})

Steps S8 and S9) Based on the above Subscriber Policy Data, PCF decides to activate the UP Exposure mechanism for this PDU session. In order to do that, PCF triggers Npcf_SMPolicyControl_Create Response message with an indication to activate the UP Exposure mechanism. (PCF requests activation of the UP Exposure mechanism for this PDU session; Npcf_SMPolicyControl_Create Response, {UP Exposure})

Step S10) Based on the above indication, SMF selects a UPF supporting the UP Exposure mechanism (EXPU) capability. (SMF selects a UPF supporting EXPU capability)

Step S11) SMF triggers PFCP Session Establishment Request message with an indication to activate the UP Exposure mechanism. It is proposed to do this via installing/activating a PDR with appId="UP Exposure", which indicates UPF to detect UP Exposure related messages (e.g. messages where the destination IP address is the one of the UPF). (PFCP Session Establishment Request; {UP Exposure})

Step S12) UPF runs the following logic:

Activates the UP Exposure channel for this PFCP session
  This is basically listening to policy request messages from the content provider. As mentioned in previous step, UPF will detect incoming packets and look for a match with the PDR with appId="UP Exposure" (where appId="UP Exposure" is locally configured at UPF to match any message where the destination IP address is the one of the UPF).
Retrieves the UPF instance identifier (UPFId) handling the PDU session, which could be simply the UPF IP address of the interface that will be used as destination address for policy request messages from the content provider. Other identifiers are possible (e.g. FQDN).

(UPF activates UP Exposure and stores the UPF instance (UPFId) for the UE (UEId) in UDR)

Step S13) UPF stores in UDR the UPF instance (UPFId) handling the PDU session. In order to do this, UPF triggers a Nudr_Store request message including both the UEId and the UPFId. This assumes an SBA based UPF which is able to directly access UDR. (Nudr_Store Request, {UEId, UPFId})

Steps S14 and S15) UDR stores the association between the UEId and the UPFId and answers back UPF with a successful response (200 OK). (UDR Stores the association between the UEId and the UPFId; 200 OK)

Step S16) UPF answers back to SMF with a successful PFCP Session Establishment Response message. (PFCP Session Establishment Response)

Step S17) SMF answers the Nsmf PDU Session Create Request in Step 4 with a Nsmf PDU Session Create Response to AMF. (Nsmf PDU Session Create Response)

Step S18) AMF answers the N1 PDU Session Establishment Request in Step S3 with a N1 PDU Session Establishment Response to UE. (N1 PDU Session Establishment Response)

Steps S19 and S20) An application (e.g. example.com) with support of UP Exposure is started. The application client triggers UPF discovery by sending a DNS Query message towards Operator DNS Server (see preconditions on how UE application gets the identity of the Operator DNS Server). The DNS Query includes as parameters:

FQDN (e.g. operatorX.upf.com) indicating request for the UPF instance handling the PDU session
UEId which identifies the UE (and/or subscriber)
(An application (e.g. example.com) with support of UP Exposure is started. The application client triggers UPF discovery; DNS Query, {FQDN=operator.upf.com, UEId})

Step S21) Operator DNS Server triggers a Nudr_Query request message towards UDR in order to find the UPF instance handling the PDU session for this UE (UEId). (Nudr Query Request, {UEId, UPF})

Steps S22 and S23) UDR looks for the UPF instance (UPFId) associated to UEId, and answers back to Operator DNS Server with a Nudr_Query response message including the UPF instance (UPFId). (UDR looks for the UPF instance (UPFId) associated to UEId; Nudr_Query Response, {UPFId})

Step S24) Operator DNS Server answers UE application client with a DNS Answer message including the UPF instance identifier (UPFId). (DNS Answer, {UPDFId})

Steps S25 and S26) UE application client stores the UPF instance identifier (UPFId) handling the PDU session (e.g. UPF IP address, that will be used as destination IP address for any UP Exposure message during this user's PDU session). The UE application client sets up the exposure channel towards the discovered UPF (UPFId). In order to do this, UE application client triggers a Nupf_Policy request (HTTPS POST) including as parameters:

appId=example.com
flowInformation, which includes the flow information, e.g. 5-tuple/s, that will allow the network operator to identify the traffic which corresponds to the above appId.
policyInformation, indicating the requested policy for the application, e.g. Sponsored data or a certain QoS handling.

(The application client setups the exposure channel towards the discovered UPF; Nupf_Policy request (HTTPS POST), {appId=example.com, flowinformation, policyinformation)

Steps S27 and S28) UPF detects the above message (which matches the PDR with appId="UP Exposure" referred in Step S11 above) and stores the flowInformation and triggers a policy request to PCF by sending a Npcf_Policy request (HTTPS POST) message including as parameters:

appId=example.com policyInformation, indicating the requested policy for the application, e.g. Sponsored data or a certain QoS handling.

(UPF stores the flowInformation and triggers a policy request to PCF; Npct_Policy request (HTTPS POST), {appId=example.com, policyInformation})

Steps S29 and S30) PCF checks if the requested policy is allowed. If so, it answers back to UPF with a successful response (200 OK). (PCF checks if the requested policy is allowed; 200 OK)

Step S31) UPF answers the message in Step 26 above with a successful response (200 OK). (200 OK)

Steps S32, S33 and S34) UPF detects and classifies application (example.com) traffic by matching it against the flowInformation and applies the corresponding policies indicated in policyInformation (e.g. Sponsored data and/or QoS handling). (example.com traffic; UPF detects and classifies application (example.com) traffic by matching it against the flowInformation and applies the corresponding policies indicated in policyInformation; example.com traffic)

Finally, the solution described in this application does not only apply to 5G network architecture, but the same mechanisms can be applied to 4G, just by replacing:

PCF by PCRF
SMF by PGW-C or TDF-C
UPF by PGW-U or TDF-U.

Figure 7:
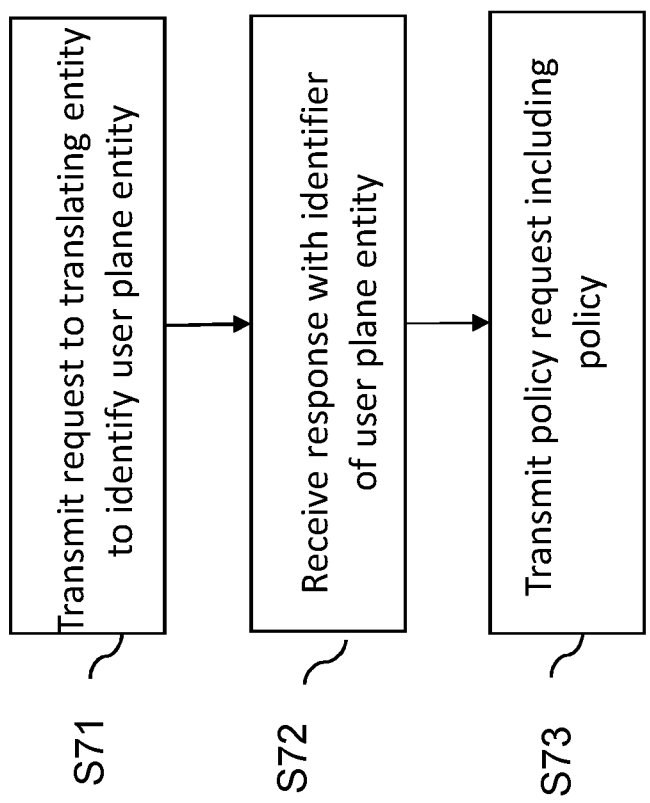
FIG. 7 shows an example schematic flowchart of a method carried out at the user equipment which requests the data packet flow in the situation shown in FIGS. 3 to 6.

FIG. 7 summarizes some of the steps carried out by the user equipment 100 in the method discussed above in connection with FIGS. 5 and 6. In step S71 the user equipment transmits a request to the translating entity to identify the user plane entity. This request requests the translating entity to identify the user plane entity which can handle the data packet flow in the cellular network as discussed above in step S20. Furthermore, the user equipment receives a response from the translating entity comprising the identifier of the user plane entity as mentioned above in step S24.

Furthermore, a policy request is transmitted to the identified user plane entity which informs the user plane entity of the policy to be applied to the data packet flow. This was discussed above in step S26.

Figure 8:
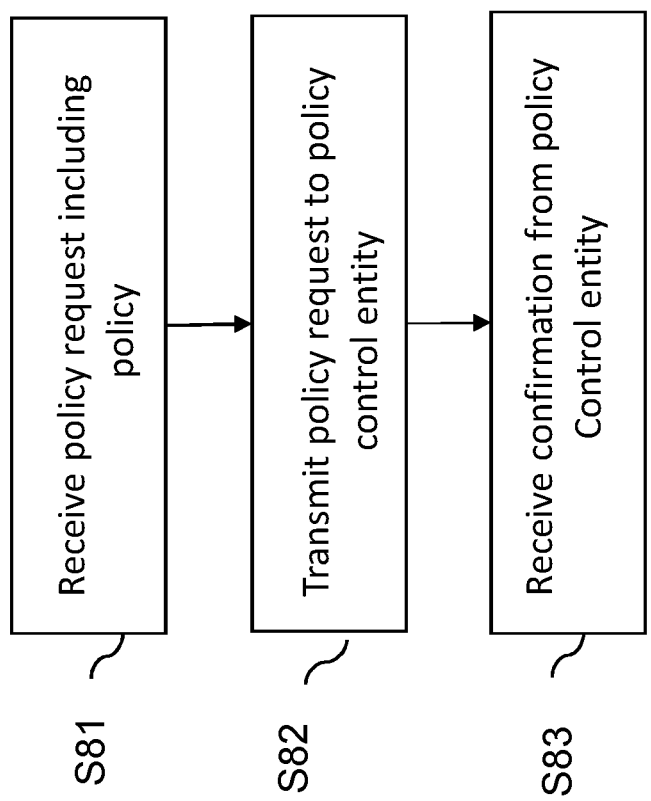
FIG. 8 shows an example schematic flowchart of a method carried out by the user plane entity handling the data packet flow in the situation shown in FIGS. 3 to 6.

FIG. 8 summarizes some of the steps carried out at the user plane entity in the method mentioned in FIGS. 5 to 6. In a first step S81 the user plane entity receives a policy request which comprises a flow identifier which helps to identify the data packet flow in the cellular network. This policy request, also named first policy request, additionally comprises the policy information indicating the policy to be applied to the data packet flow in the network. This was discussed above in step S26. The user plane entity then transmits a policy request to the policy control entity 300 wherein this policy request, also comprises the flow identifier and the policy information. This was discussed above in connection with step S28. Furthermore, in step S83 a confirmation is received from the policy control entity that the transmitted policy is allowed as discussed above in connection with step S30.

Figure 9:
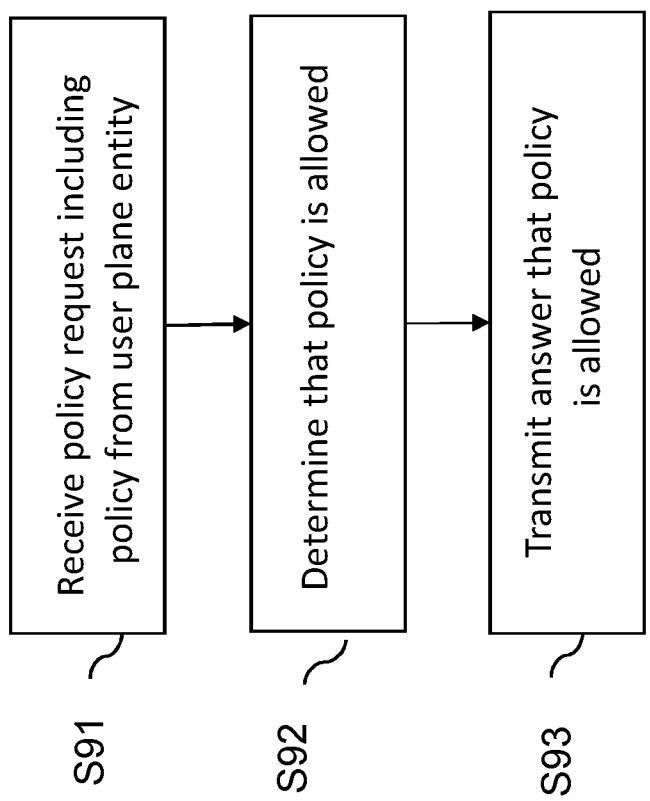
FIG. 9 shows an example schematic flowchart of a method carried out by a policy control entity controlling the policy in a situation as shown in FIGS. 3 to 6.

FIG. 9 summarizes the steps for the policy control entity. In step S91 the policy control entity receives the policy request from the user plane entity. This step describes the receiving side from step S82 discussed in FIG. 8 and step S28 of FIG. 6. In step S92 the policy control entity checks if the requested policy is allowed as discussed in step S29 above. In step S93 the policy control entity then transmits a response to the user plane entity that the policy as received from the user plane entity is allowed. This was discussed above in step S30.

Figure 10:
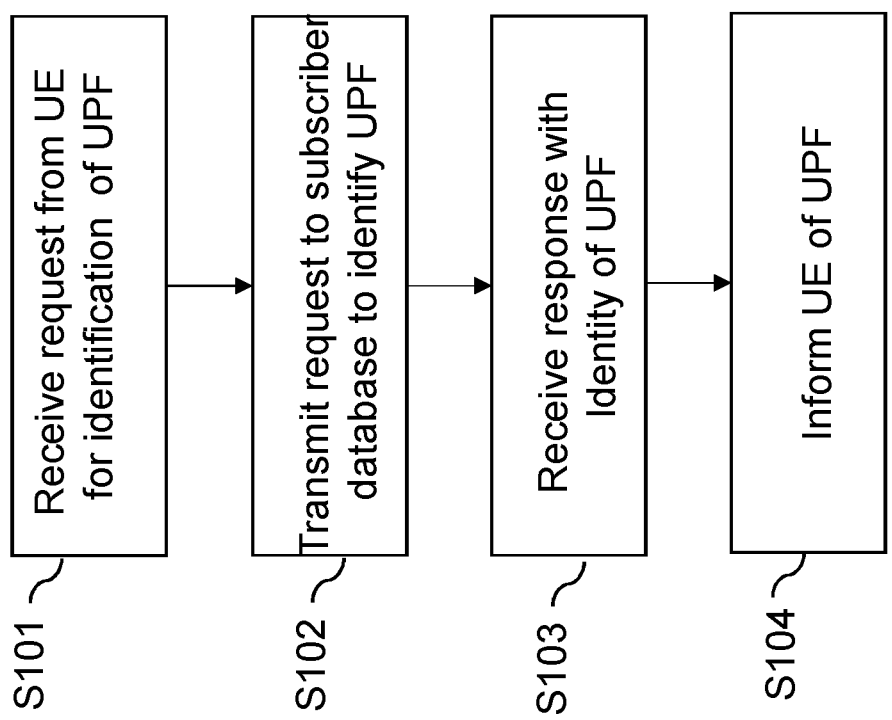
FIG. 10 shows an example schematic flowchart of a method carried out by the translating entity in a situation as shown in FIGS. 3 to 6.

FIG. 10 summarizes the steps carried out at the translating entity or DNS server. In step S101 the translating entity receives the request from the UE which requests an identification of the user plane entity configured to handle the data packet flow in the present scenario. This was discussed above in FIG. 6 in connection with step S20. In step S102 the translating entity transmits a request to a subscriber database to identify the user plane entity which can handle the data packet flow. This was discussed above in connection with step S21. The translating entity then receives a response in step S103, wherein this response comprises the user plane identifier identifying the user plane entity. Finally, in step S104 the translating entity transmits the information about the user plane entity to the user equipment as mentioned in step S24 above.

Figure 11:
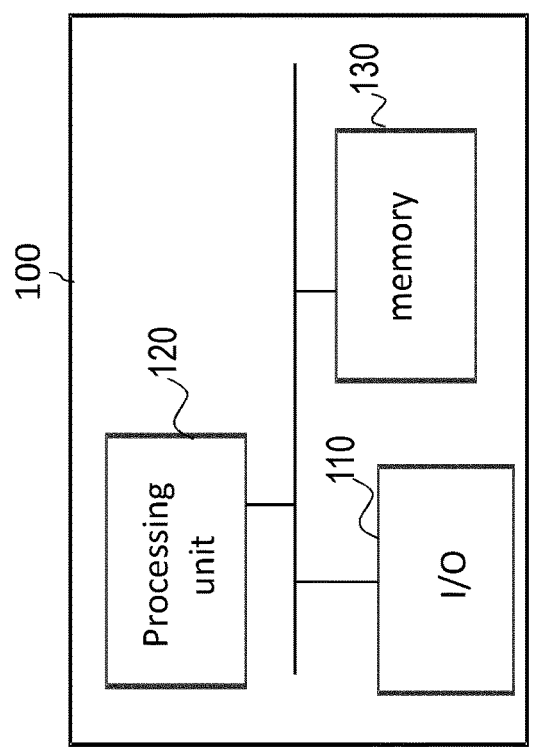
FIG. 11 shows an example schematic representation of a user equipment configured to operate in a situation discussed above in connection with FIGS. 3 to 6.

FIG. 11 shows a schematic architectural view of a user equipment 100 involved in the different method steps above. The user equipment 100 comprises an interface or input/output 110 which is provided for transmitted user data or control messages to other entities as mentioned above and which is provided for receiving user data such as the data packet flow or control messages from other entities. The interface or input/output is especially configured to exchange the messages discussed above in FIGS. 5 and 6 in which the user equipment is involved. The user equipment furthermore comprises a processing unit 120 which is responsible for the operation of the user equipment. The processing unit 120 can comprise one or more processors and can carry out instructions stored on a memory 130, wherein the memory may include a read-only memory, a random access memory, a mass storage, a hard disk, or the like. The memory can furthermore include suitable program code to be executed by the processing unit 120 so as to implement the above described functionalities in which the user equipment is involved.

Figure 12:
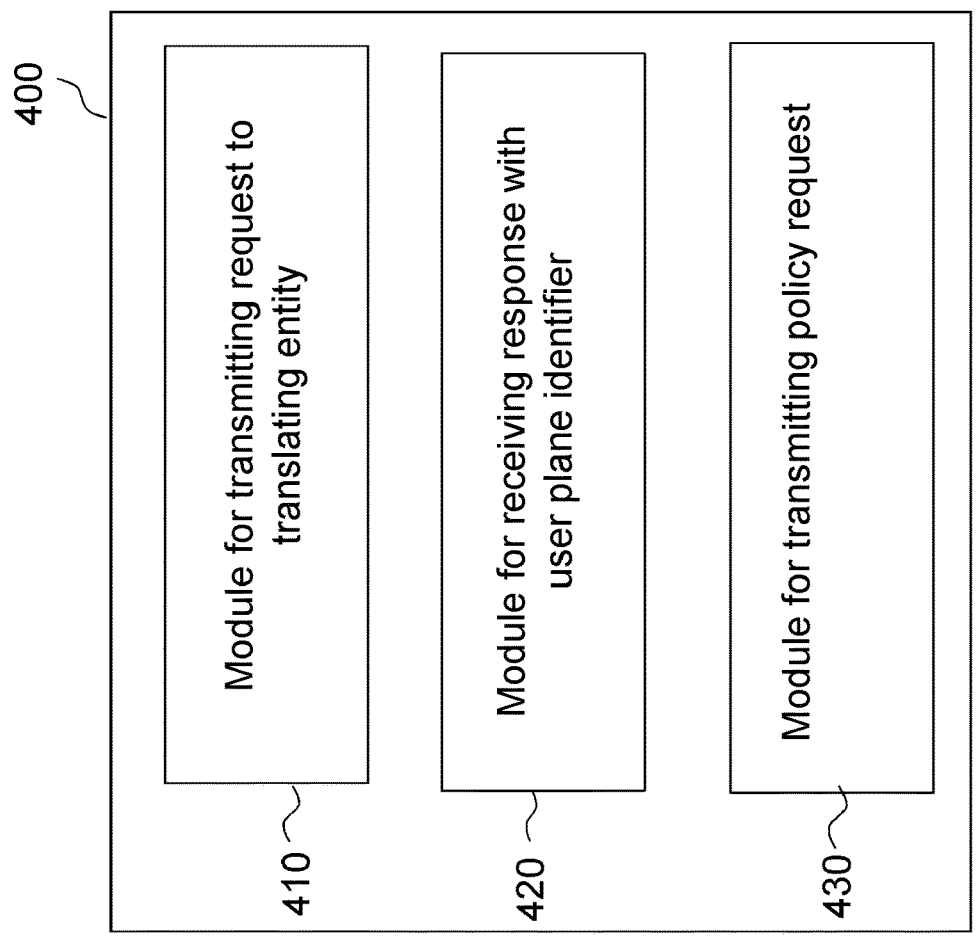
FIG. 12 shows another example schematic representation of a user equipment configured to operate in a situation discussed in connection with FIGS. 3 to 6.

FIG. 12 shows another example schematic architectural view of a user equipment 400 which comprises a first module configured to transmit the request to the translating entity wherein this request requests the identification of the user plane entity as mentioned above in step S20. The user equipment 400 comprises a second module 420 configured to receive a response to the first request wherein this response comprises an identifier of the user plane entity as mentioned above in step S24. Another module 430 is provided which is configured to transmit a policy request to the identified user plane entity wherein this policy request already indicates the policy to be applied to the data packet flow as discussed above in step S26.

Figure 13:
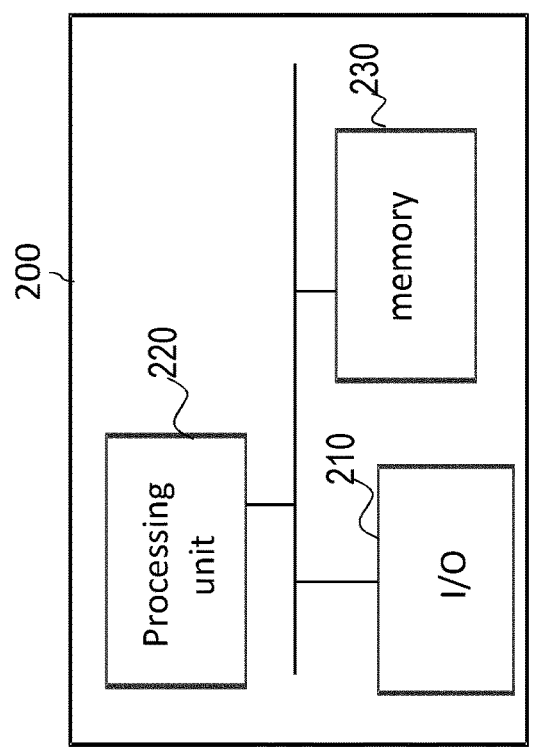
FIG. 13 shows an example schematic representation of a user plane entity configured to handle the data packet flow in a scenario discussed in connection with FIGS. 3 to 6.

FIG. 13 shows an example schematic architectural view of a user plane entity 200 which can handle the data packet flow and which can operate as mentioned above. The user plane entity 200 comprises an interface or input/output 210 provided for transmitting user data or control messages to other entities and configured to receive user data or control messages from other entities. The user plane entity especially handles data packet flow and also the control messages discussed above. The user plane entity comprises a processing unit 220 which is responsible for the operation of the user plane entity 200. The processing unit 220 comprises one or more processors and can carry out instructions stored on a memory 230, wherein the memory may include a read-only memory, a random access memory, a mass storage, a hard disk, or the like. The memory can furthermore include suitable program code to be executed by the processing unit 220 so as to implement the above described functionalities in which the user plane entity 200 is involved.

Figure 14:
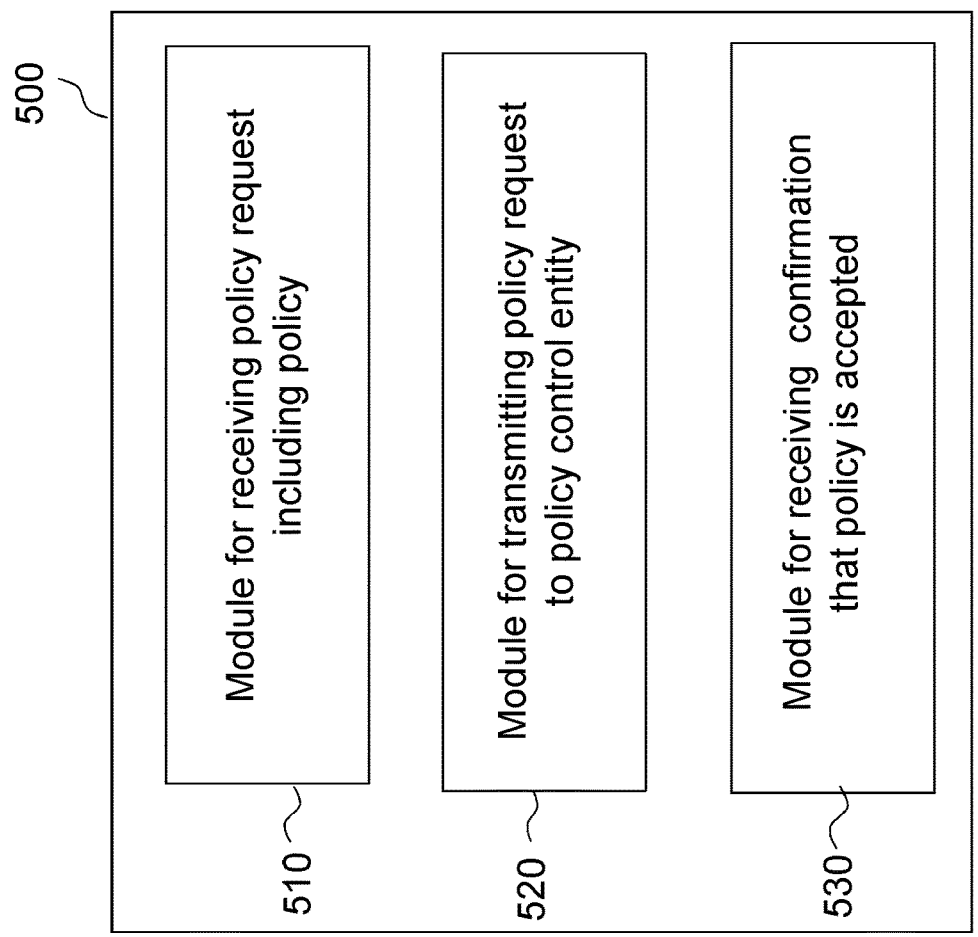
FIG. 14 shows another example schematic representation of a user plane entity configured to handle the data packet flow in a scenario discussed in connection with FIGS. 3 to 6.

FIG. 14 shows another schematic architectural view of a user plane entity 500 which can operate as discussed above in connection with FIGS. 3 to 6. The user plane entity comprises a first module 510 configured to receive a policy request which comprises a flow identifier and which comprises policy information indicating the policy to be applied to the data packet flow. Module 510 can be implemented in order to carry out step S26 discussed above. A second module 520 is provided which is configured to transmit a policy request to the policy control entity module 520 is configured to carry out especially step S28 mentioned above. A third module 530 is provided which is configured to receive the confirmation that the policy is allowed as mentioned above in step S13.

Figure 15:
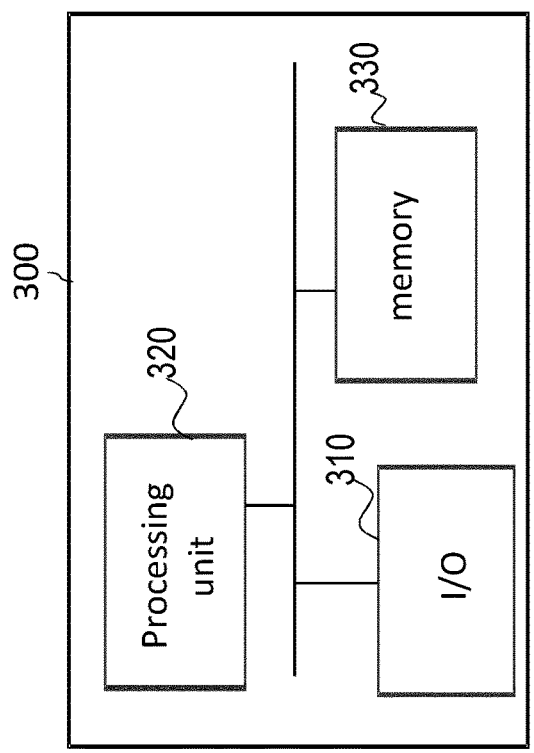
FIG. 15 shows an example schematic representation of a policy control entity configured to control the policy in a scenario discussed in connection with FIGS. 3 to 6.

FIG. 15 shows an example schematic architectural view of the policy control entity 300 which can carry out the policy control as mentioned above in connection with FIGS. 3 to 6. The policy control entity comprises an interface or input/output 310 configured to transmit user data or control messages and configured to receive user data and control messages. The policy control entity comprises a processing unit 320 which is responsible for the operation of the policy control entity 300. The processing unit 320 comprises one or more processors and can carry out instructions stored on a memory 330, wherein the memory may include a read-only memory, a random access memory, a mass storage, a hard disk or the like. The memory furthermore includes suitable program code to be executed by the processing unit 320 so as to implement the above described functionalities in which the policy control entity is involved.

Figure 16:
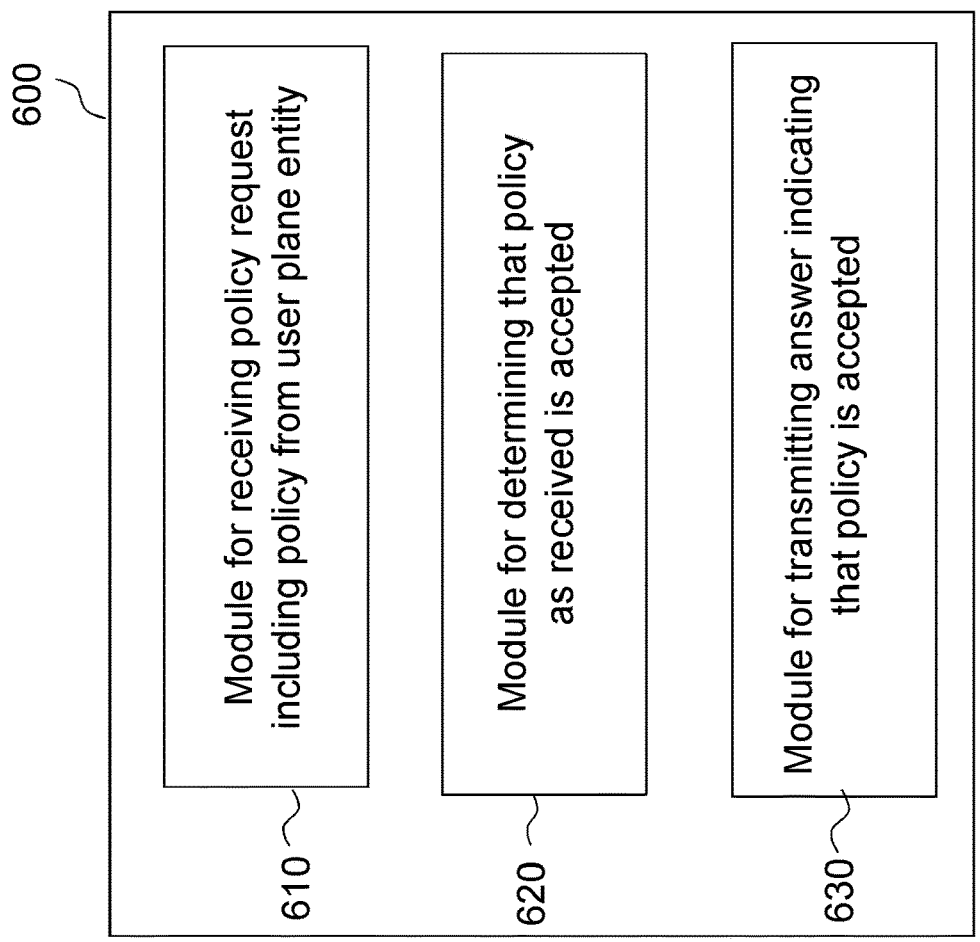
FIG. 16 shows another example schematic representation of a policy control entity configured to control the policy in a scenario discussed in connection with FIGS. 3 to 6.

FIG. 16 shows another example schematic architectural view of the policy control entity 600 which comprises a first module 610 configured to receive the policy request including the policy for the data packet flow wherein the policy request is received from the user plane entity and module 610 is especially configured to carry out step S28 discussed above. The policy control entity furthermore comprises a second module 620 which is configured to determine that the policy as received is accepted. This was discussed above in connection with step S29. The policy control entity 600 furthermore comprises a third module 630 configured to transmit an answer to the user plane entity that the policy is accepted as mentioned above in step S30.

Figure 17:
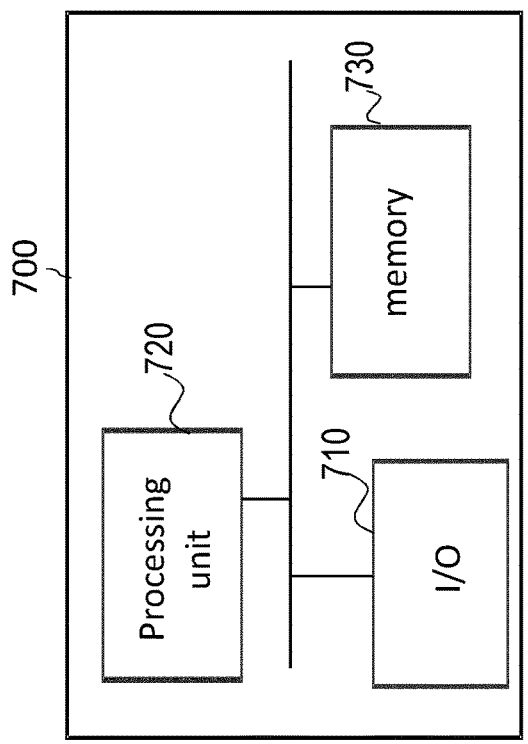
FIG. 17 shows an example schematic representation of a translating entity configured to translate a name of the application entity providing the data packet flow to an address of the application entity in a scenario discussed in connection with FIGS. 3 to 6.

FIG. 17 shows an example schematic architectural view of the translating entity 700 which can operate as discussed above in connection with FIGS. 3 to 6. The translating entity comprises an interface or input output 710 configured to receive user data or control messages and configured to transmit user data or control messages. The interface 710 is especially configured to receive the query from the UE as mentioned in step S20 and is configured to transmit an answer to the UE as mentioned in step S24. The translating entity furthermore comprises a processing unit 720 which is responsible for the operation of the translating entity. The processing unit 720 can comprise one or more processors and can carry out instructions stored on a memory 730, wherein the memory may include a read-only memory, a random access memory, a mass storage, a hard disk or the like. The memory can furthermore include suitable program code to be executed by the processing unit 720 so as to implement the above-described functionalities in which the translating entity is involved.

Figure 18:
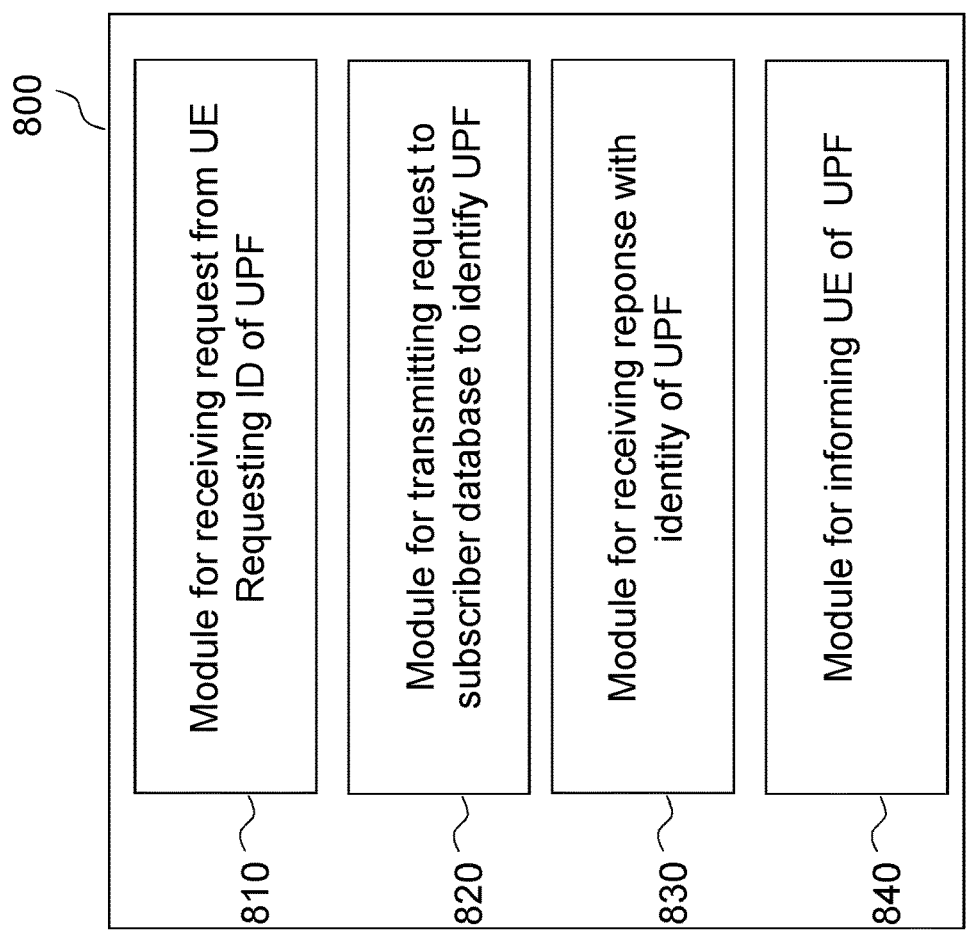
FIG. 18 shows another example schematic representation of a translating entity configured to translate a name of the application entity providing the data packet flow to an address of the application entity in a scenario discussed above in connection with FIGS. 3 to 6.

FIG. 18 shows another example schematic architectural view of the translating entity which can operate as discussed above in connection with FIGS. 3 to 6. The translating entity comprises a first module 810 configured to receive the request from the UE wherein the request requests an identification of the user plane entity. A second module 820 is provided configured to transmit the request to a subscriber database to identify the user plane entity as mentioned above in step S21. A module 830 is provided configured to receive the response with the identity of the user plane entity as mentioned in step S23. A module 840 is provided configured to inform the UE about the user plane entity as mentioned in step S24.

From the above said some general conclusions can be drawn:

As far as the operation of the user equipment is concerned the first request such as the request transmitted in step S20 comprises a user identifier identifying the user equipment and the name of the application entity.

As far as the policy request such as the request of step S26 is concerned, this policy request furthermore comprises the name of the application entity.

Furthermore, the policy request as the request transmitted in step S26 can furthermore comprise a quality of service parameter to be applied to the data packet flow in the cellular network or an information whether a subscriber of the user equipment should be charged for the transmission of the data packet flow through the cellular network. The network operator and the content provider may have agreed upon the fact that the subscriber is not subscribed for traffic coming from the application of the content provider.

As far as the user plane entity 200 is concerned before the first policy request is received such as the request of step S26, the session management entity of the cellular network may be informed of the fact that the user plane entity is configured to operate in the exposure operating mode in which the content provider operating the application function informs the cellular network about the policy to be applied to the data packet flow in the network. This was discussed above in step S1. In the same way, before the policy request of step S26 is received a session establishment request may be received from the session management entity of the network. This session establishment requests to activate the exposure operating mode in which the content provider operating the application entity informs the cellular network about the policy to be applied to the data packet flow. This was implemented above in step S11.

Furthermore, the session establishment request may indicate to the user plane entity to detect messages related to the exposure operating mode.

Furthermore it is possible that before the policy request is received, a subscriber database of the cellular network is informed of a user identifier which identifies the user equipment and of identifier of the user plane entity as mentioned in step S13 above.

As far as the policy control entity is concerned, before the policy control entity receives the policy request a query message may be received from a subscriber database including an indication to activate an exposure operating mode in which the content provider operating the application entity informs the cellular network about the policy to be applied to the data packet flow. This was discussed above in connection with step S7.

Furthermore, in response to the query message the policy control entity can activate the exposure operating mode and a session management entity is requested to activate the exposure operating mode as mentioned above in steps S8 and S9.

Summarizing, the present application provides an efficient mechanism to exchange information between the content provider and the network operator. It avoids the use of the network exposure function which is a complex network function not supported by all of the network operators.

Furthermore it provides a simple correlation between the exposure channel and the user plane application traffic.

Furthermore, the exposure information exchanged between the content provider and the network operator does not have any impact on the UE modem.

Furthermore, the service based user plane entity is aligned with the latest 3GPP implementations.

The invention claimed is:

1. A method for operating a user plane entity configured to handle a data packet flow transmitted from an application entity through a cellular network to a user equipment, the method comprising:
   receiving a first policy request from the user equipment, the first policy request comprising a flow identifier allowing an identification of the data packet flow in the cellular network, and policy information indicating a policy to be applied to the data packet flow in the cellular network for a transmission of the data packet flow through the cellular network;
   transmitting a second policy request to a policy control entity of the cellular network, the second policy request comprising the policy information;
   receiving a confirmation from the policy control entity that the transmitted policy contained in the policy information is accepted; and
   wherein before the first policy request is received, a subscriber database of the cellular network is informed of a user identifier identifying the user equipment and of an identifier of the user plane entity.

2. The method according to claim 1, wherein before the first policy request is received, a session management entity of the cellular network is informed that the user plane entity is configured to operate in an exposure operating mode in which a content provider operating the application entity informs the cellular network about the policy to be applied to the data packet flow in the cellular network.

3. The method according to claim 1, wherein before the first policy request is received, a session establishment request is received from a session management entity of the cellular network, to activate an exposure operating mode in which a content provider operating the application entity informs the cellular network about the policy to be applied to the data packet flow in the cellular network.

4. The method according to claim 3, wherein the session establishment request indicates to the user plane entity to detect any messages related to the exposure operating mode.

5. A user plane entity configured to handle a data packet flow transmitted from an application entity through a cellular network to a user equipment, the user plane entity comprising:
   at least one processing circuit; and
   memory circuitry comprising instructions executable by the at least one processing circuit, whereby executing the instructions configures the user plane entity to:
   receive a first policy request, the policy request comprising a flow identifier allowing an identification of the data packet flow in the cellular network, and policy information indicating a policy to be applied to the data packet flow in the cellular network for a transmission of the data packet flow through the cellular network;
   transmit a second policy request to a policy control entity of the cellular network, the second policy request comprising the flow identifier and the policy information;
   receive a confirmation from the policy control entity that the transmitted policy contained in the policy information is accepted; and
   wherein executing the instructions further configures the user plane entity to, before the first policy request is received, inform a subscriber database of the cellular network of a user identifier identifying the user equipment and of an identifier of the user plane entity.

6. The user plane entity according to claim 5, wherein executing the instructions further configures the user plane entity to, before the first policy request is received, inform a session management entity of the cellular network that the user plane entity is configured to operate in an exposure operating mode in which a content provider operating the application entity informs the cellular network about the policy to be applied to the data packet flow in the cellular network.

7. The user plane entity according to claim 5, wherein executing the instructions further configures the user plane entity to, before the first policy request is received, receive a session establishment request from a session management entity of the cellular network to activate an exposure operating mode in which a content provider operating the application entity informs the cellular network about the policy to be applied to the data packet flow in the cellular network.

8. The user plane entity according to claim 7, wherein the session establishment request indicates to the user plane entity to detect any messages related to the exposure operating mode.

9. A method for operating a policy control entity of a cellular network, wherein a data packet flow is transmitted from an application entity through a cellular network to a user equipment, the method comprising:
   receiving a policy request from a user plane entity handling the data packet flow in the cellular network, the policy request comprising a flow identifier allowing an identification of the data packet flow in the cellular network, and policy information indicating a policy to be applied to the data packet flow in the cellular network for a transmission of the data packet flow through the cellular network;
   determining that the policy as received in the policy request is allowed; and
   transmitting an answer to the policy request to the user plane entity indicating that the policy is allowed; and
   wherein before the policy request is received, a query message is received from a subscriber database including an indication to activate an exposure operating mode in which a content provider operating the application entity informs the cellular network about the policy to be applied to the data packet flow in the cellular network.

10. The method according to claim 9, wherein in response to the query message the exposure operating mode is activated and a session management entity is requested to activate the exposure operating mode.

11. A policy control entity configured to control a policy of data packet flows through a cellular network, wherein a data packet flow is transmitted from an application entity through the cellular network to a user equipment, the policy control entity comprising:

at least one processing circuit; and
memory circuitry comprising instructions executable by the at least one processing circuit, whereby executing the instructions configures the policy control entity to:
receive a policy request from a user plane entity handling the data packet flow in the cellular network, the policy request comprising a flow identifier allowing an identification of the data packet flow in the cellular network, and policy information indicating a policy to be applied to the data packet flow in the cellular network for a transmission of the data packet flow through the cellular network;
determine that the policy as received in the policy request is allowed;
transmit an answer to the policy request to the user plane entity indicating that the policy is allowed; and
wherein executing the instructions further configures the policy control entity to, before the policy request is received, receive a query message from a subscriber database including an indication to activate an exposure operating mode in which a content provider operating the application entity informs the cellular network about the policy to be applied to the data packet flow in the cellular network.

12. The policy control entity according to claim 11, wherein executing the instructions further configures the policy control entity to, in response to the query message, active the exposure operating mode and to request a session management entity to active the exposure operating mode.

* * * * *